US009764445B2

United States Patent
Rizzo et al.

(10) Patent No.: US 9,764,445 B2
(45) Date of Patent: Sep. 19, 2017

(54) SYSTEMS AND METHODS FOR DRESSING GRINDING WHEELS

(71) Applicant: United Technologies Corporation, Hartford, CT (US)

(72) Inventors: John P. Rizzo, Vernon, CT (US); Gordon M. Reed, Plantsville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 60 days.

(21) Appl. No.: 14/563,288

(22) Filed: Dec. 8, 2014

(65) Prior Publication Data

US 2015/0174731 A1    Jun. 25, 2015

Related U.S. Application Data

(60) Provisional application No. 61/919,598, filed on Dec. 20, 2013.

(51) Int. Cl.
| | |
|---|---|
| *B24B 53/00* | (2006.01) |
| *B24B 53/065* | (2006.01) |
| *B24B 53/075* | (2006.01) |
| *B24B 53/12* | (2006.01) |
| *B23K 26/364* | (2014.01) |
| *B23K 26/00* | (2014.01) |
| *B23K 26/082* | (2014.01) |
| *B23K 26/361* | (2014.01) |
| *B23K 103/00* | (2006.01) |

(52) U.S. Cl.
CPC ........ *B24B 53/065* (2013.01); *B23K 26/0084* (2013.01); *B23K 26/082* (2015.10); *B23K 26/361* (2015.10); *B23K 26/364* (2015.10); *B24B 53/001* (2013.01); *B24B 53/075* (2013.01); *B24B 53/12* (2013.01); *B23K 2203/50* (2015.10)

(58) Field of Classification Search
CPC ... B23K 26/364; B24B 53/001; B24B 53/005; B24B 53/04; B24B 53/075; B24B 53/12
See application file for complete search history.

(56) References Cited

U.S. PATENT DOCUMENTS

| | | | | |
|---|---|---|---|---|
| 4,533,812 A | * | 8/1985 | Lorenz | B23F 21/02 219/121.19 |
| 6,217,422 B1 | * | 4/2001 | Franca | B24B 37/04 451/444 |
| 6,312,324 B1 | * | 11/2001 | Mitsui | B24B 3/06 125/39 |
| 6,478,661 B2 | * | 11/2002 | Ohmori | B24B 13/015 451/21 |
| 6,899,592 B1 | * | 5/2005 | Kojima | B24B 37/245 451/286 |
| 7,175,509 B2 | * | 2/2007 | Gunjima | B23K 26/0078 451/177 |
| 2015/0028007 A1 | * | 1/2015 | Pluss | B24B 53/00 219/121.69 |

* cited by examiner

*Primary Examiner* — Timothy V Eley
(74) *Attorney, Agent, or Firm* — Snell & Wilmer, L.L.P.

(57) ABSTRACT

Systems and methods are disclosed herein for dressing and trueing grinding wheels. A laser may be directed substantially tangential to a grinding surface of a grinding wheel. The laser may be a continuous wave laser and may ablate material from the grinding surface. The laser may move relative to the grinding wheel in order to ablate shaped surface profiles into the grinding surface.

13 Claims, 6 Drawing Sheets

SYSTEMS AND METHODS FOR DRESSING GRINDING WHEELS

CROSS-REFERENCE TO RELATED APPLICATIONS

This application is a nonprovisional of, and claims priority to, and the benefit of U.S. Provisional Application No. 61/919,598, entitled "SYSTEMS AND METHODS FOR DRESSING GRINDING WHEELS," filed on Dec. 20, 2013, which is hereby incorporated by reference in its entirety.

FIELD

The present disclosure relates generally to grinding wheels. More particularly, the present disclosure relates to dressing grinding wheels.

BACKGROUND

Grinding wheels generally comprise an abrasive compound in a circular component. Grinding wheels may be rotated at high speeds to remove material from a workpiece. During grinding, a coolant may be applied to the grinding wheel in order to minimize overheating of the grinding wheel or the workpiece. Dressing the grinding wheel may expose abrasive grains by removing the grinding wheel bond or workpiece material embedded in the grinding surface of the grinding wheel. Dressing may improve grinding efficiency of the grinding wheel. Conventional dressing techniques involve a dressing tool, such as a diamond wheel grinding the grinding surface of the grinding wheel in order to achieve a desired shape and surface finish of the grinding surface.

SUMMARY

A method of dressing a grinding wheel may comprise directing a laser substantially tangential to a grinding surface of a grinding wheel. The method may comprise rotating the grinding wheel. The method may also comprise forming a surface profile in the grinding surface using the laser.

A grinding method may comprise laser ablating a first surface profile in a grinding wheel. The method may comprise grinding a first workpiece with the grinding wheel. The method may further comprise laser ablating a second surface profile in the grinding wheel. The method may further comprise grinding a second workpiece with the grinding wheel.

A dressing system may comprise a laser and a steering mechanism. The laser may be configured to be directed substantially tangential to a grinding surface of a grinding wheel. The steering mechanism may be configured to steer the laser.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for dressing and trueing grinding wheels. A laser beam may be directed substantially tangential to a grinding surface of a grinding wheel. The laser may be a continuous wave or pulsed laser and may ablate material from the grinding surface. The laser may move relative to the grinding wheel in order to ablate a desired profile into the grinding surface. The surface profile may enhance the effect of a coolant that may be applied to the grinding surface during grinding of a workpiece, as well as diminish the horsepower necessary to drive the grinding wheel.

Figure 1:
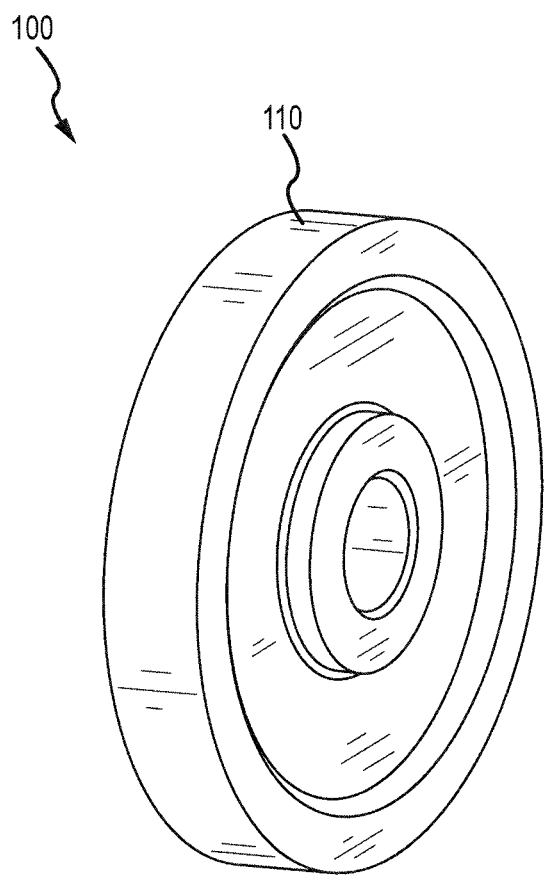
FIG. 1 illustrates a perspective view of a grinding wheel in accordance with various embodiments.

Referring to FIG. 1, a grinding wheel 100 is illustrated according to various embodiments. In various embodiments, grinding wheel 100 may comprise a multi-layer grinding wheel. Multi-layer grinding wheels may comprise a matrix of abrasive particles pressed and bonded together. In multi-layer grinding wheels, the abrasive particles may be distributed throughout the grinding wheel. Thus, as portions of grinding surface 110 are removed, additional abrasive particles may be exposed. In various embodiments, grinding wheel 100 may comprise a vitrified glass grinding wheel. However, in various embodiments, grinding wheel 100 may comprise a single-layer grinding wheel. In single-layer grinding wheels, a layer of abrasive particles may be electroplated onto the grinding surface of the grinding wheel. In various embodiments, the abrasive particles may comprise at least one of Cubic Boron Nitride ("CBN"), diamond, ceramic, Silicon Carbide, and Aluminum Oxide. Grinding wheels comprising diamond or CBN may be referred to as superabrasive. Grinding wheels comprising ceramic, Silicon Carbide, or Aluminum Oxide may be referred to as conventional.

Figure 2:
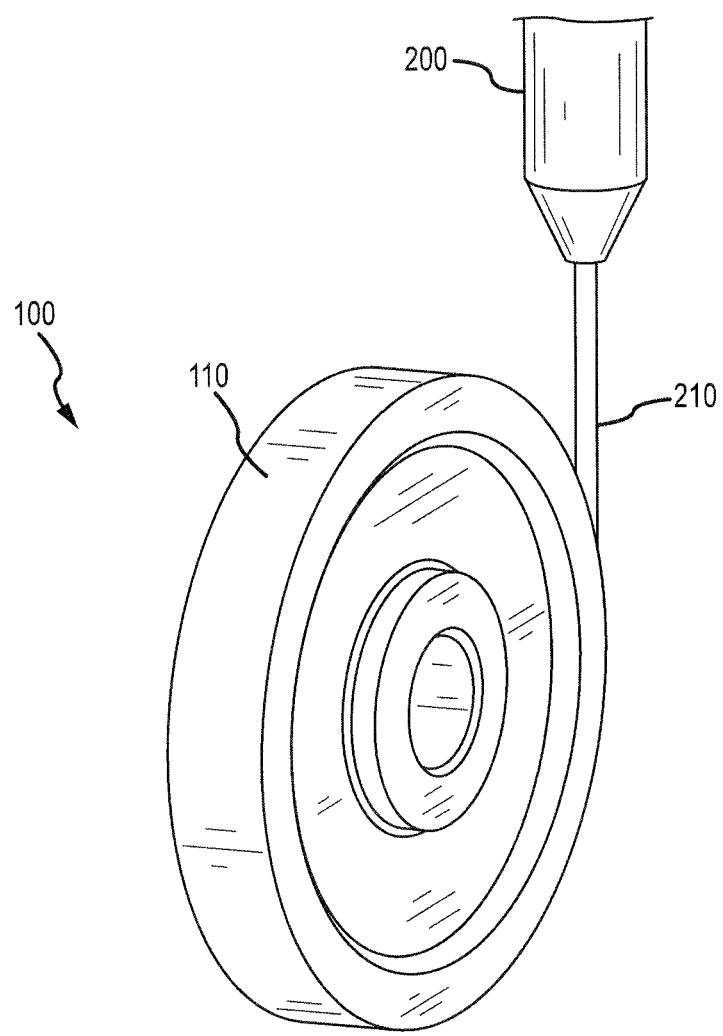
FIG. 2 illustrates a laser and a grinding wheel in accordance with various embodiments.

Referring to FIG. 2, a laser 200 is illustrated dressing grinding wheel 100. In various embodiments, laser 200 may comprise a Nd:YAG (neodymium-doped yttrium aluminum garnet) laser. Nd:YAG is a crystal that may be used as a lasing medium for solid-state lasers. In various embodiments, a Nd:YAG laser may emit a laser beam 210 comprising light at a wavelength of 1064 nm. However, in various embodiments, laser 200 may comprise a $CO_2$ laser (9400 nm-10600 nm), a fiber laser (multiple wavelengths), or any other suitable laser which may remove material from grinding wheel 100. The laser may cause material to evaporate, sublimate, or be converted to a plasma.

In various embodiments, laser 200 may be positioned substantially tangential to grinding surface 110 of grinding wheel 100. For example, in various embodiments, laser 200 may be positioned between 0 degrees to 5 degrees relative to grinding surface 110, or between 0 degrees to 10 degrees relative to grinding surface 110. The angle of laser 200 relative to grinding surface 110 may correspond to a removal rate and accuracy of material removal from grinding wheel 100.

Figure 3:
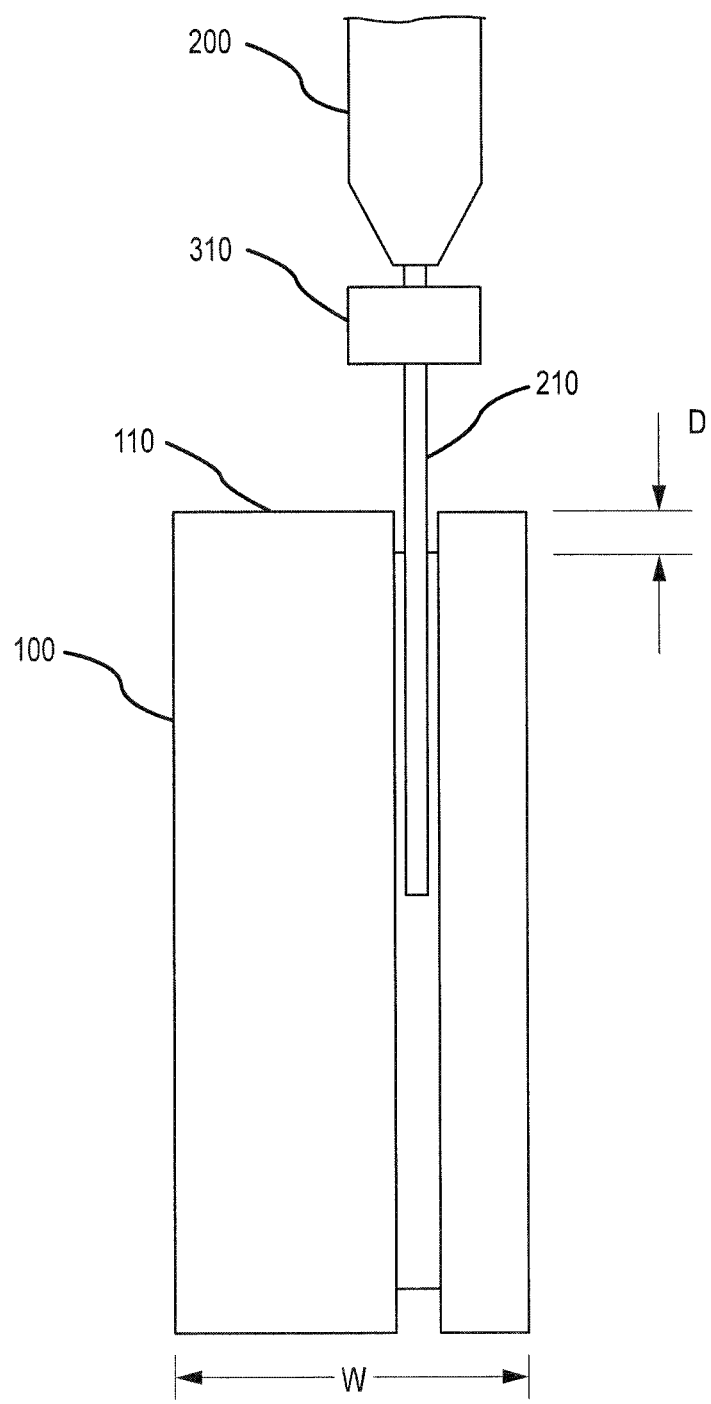
FIG. 3 illustrates a laser ablating a grinding surface of a grinding wheel in accordance with various embodiments.

Referring to FIG. 3, laser 200 is illustrated ablating grinding surface 110 according to various embodiments. In various embodiments, laser 200 may emit a continuous wave. In various embodiments, the laser may have power of between 10 Kilowatts-20 Kilowatts, or between 5 Kilowatts-50 Kilowatts.

In various embodiments, laser 200 may be moved relative to grinding wheel 100 in order to ablate patterns into grinding surface 110. In various embodiments, laser 200 may remain substantially tangential relative to grinding surface 110 while moving relative to grinding wheel 100. However, in various embodiments, the angle of laser 200 may change in order to direct laser 200 to various locations and/or depths on grinding surface 110. In various embodiments, a galvanometer 310 may steer laser beam 210 using mirrors and a servo control system. In various embodiments, a laser pattern may be computer-controlled. However, in various embodiments, the laser pattern may be manually controlled. In various embodiments, grinding wheel 100 may rotate during ablation. Thus, while laser beam 210 is focused at a particular location, laser 200 may ablate the entire circumference of grinding wheel 100 as grinding wheel 100 rotates, resulting in a radially symmetrical pattern.

The depth D of ablation may depend on the location of laser 200. In various embodiments, laser 200 may provide a deeper ablation by moving toward an axial center of grinding wheel 100. In various embodiments, laser 200 may ablate grinding surface to a depth of about 0.00001 inches-0.0005 inches (0.000025 cm-0.0013 cm). In various embodiments, laser 200 may translate across a width W of grinding wheel 100 at varying depths to impart a surface profile into grinding surface 110.

Figure 4A:
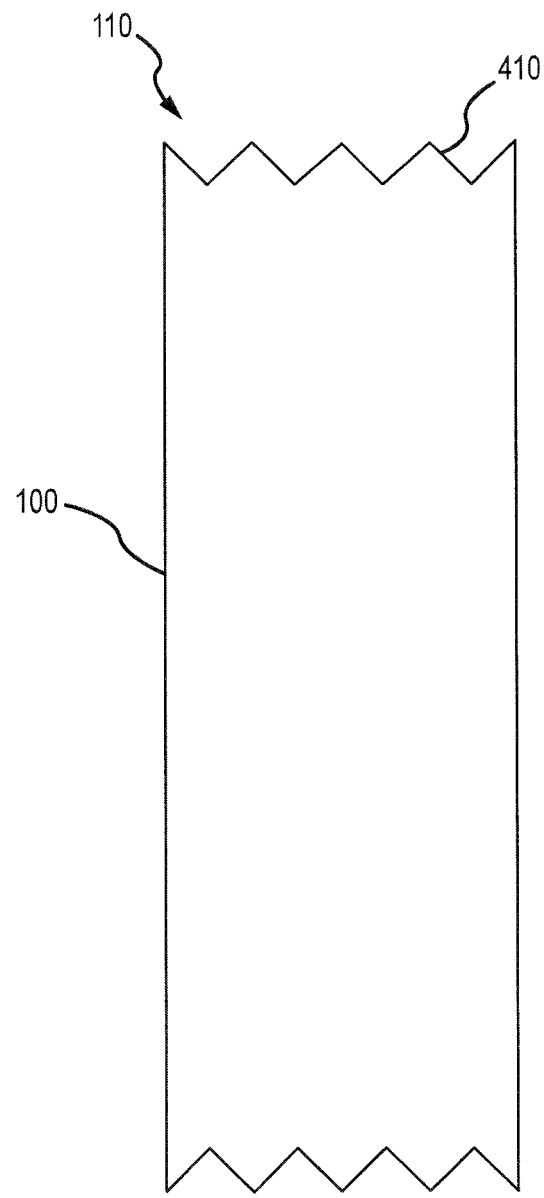
FIGS. 4A-4B illustrate various surface profiles in a grinding surface in accordance with various embodiments.
Figure 4B:
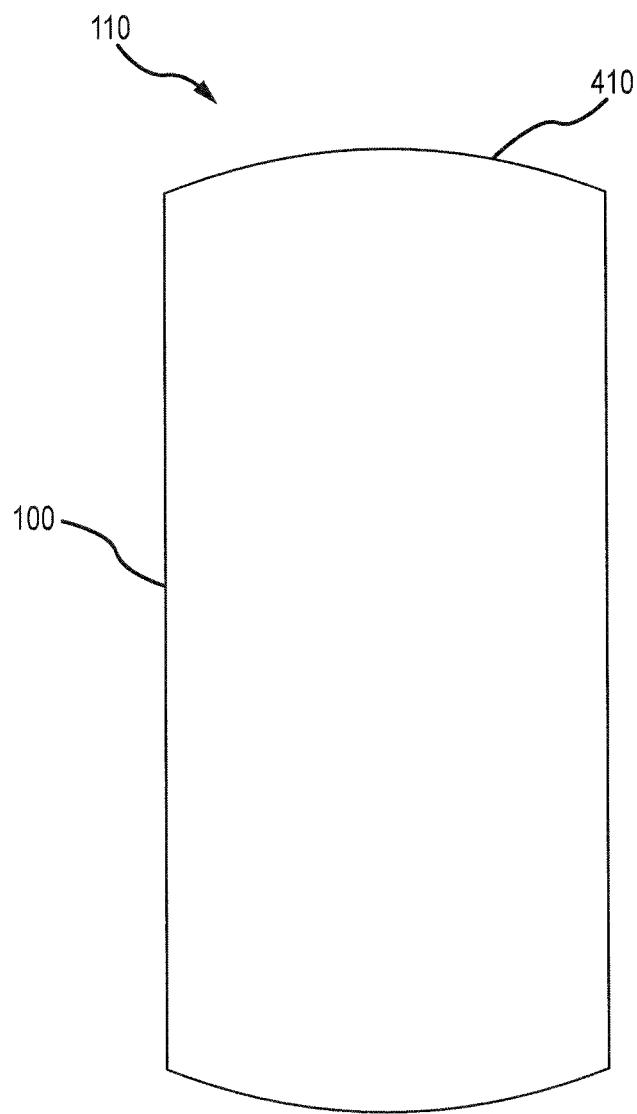

Referring to FIGS. 4A-4B, various laser ablated surface profiles are illustrated according to various embodiments. In FIG. 4A, a ribbed surface profile 410 is ablated into grinding surface 110. As laser 200 translates across width W of grinding wheel 100, laser 200 may be directed to varying depths in order to create ribbed surface profile 410. In FIG. 4B, a curved surface profile 420 is ablated into grinding surface 110. In various embodiments, the surface profiles may decrease the surface area of grinding surface 110 which makes contact with a workpiece. This may allow for additional coolant to be applied to the interface between grinding surface 110 and the workpiece. Additionally, the reduced surface area may decrease the horsepower necessary to turn grinding wheel 100 during grinding. In various embodiments, the surface profile may be designed to grind a specific workpiece.

In addition to dressing a particular surface profile in grinding wheel 100, in various embodiments laser 200 may true grinding wheel 100. As grinding wheel 100 rotates, laser 200 may ablate material at a constant radius to ensure radial symmetry of grinding wheel 100. Furthermore, in conventional techniques which utilize physical contact from a dressing or trueing tool, material may be compacted into the pores of grinding wheel 100, requiring an additional step of applying a high coolant pressure to force out the excess material. In contrast, by laser ablating grinding wheel 100, material may be removed from grinding wheel 100 without forcing the material into the pores, and without significant load on grinding wheel 100 or the axle or spindle.

Figure 5:
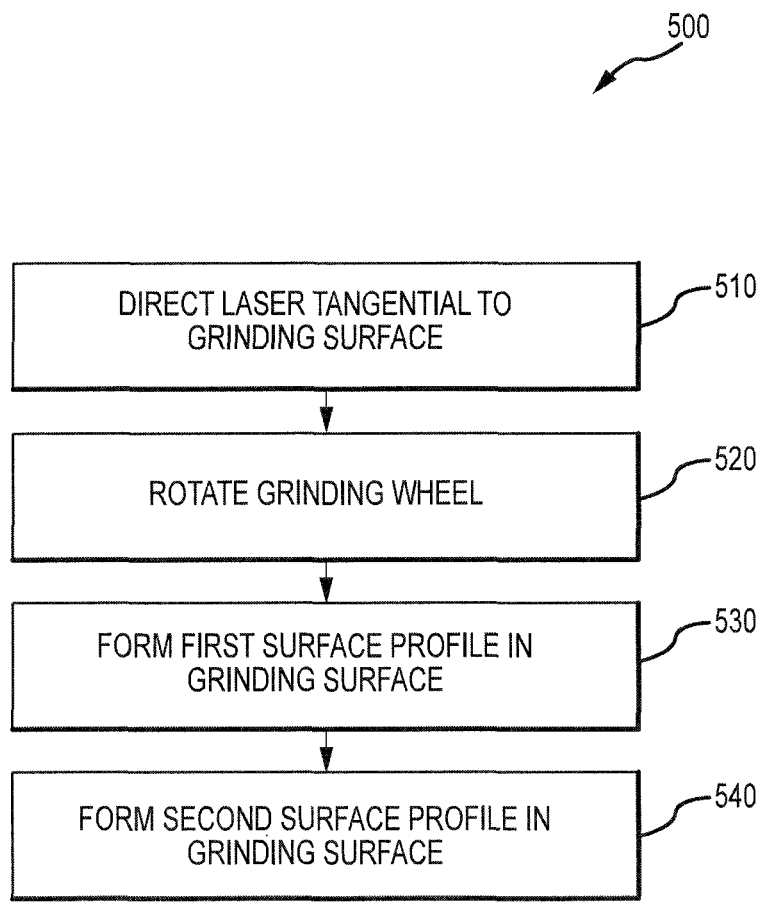
FIG. 5 illustrates a flow diagram of a process for dressing a grinding wheel in accordance with various embodiments.

Referring to FIG. 5, a process 500 of dressing and trueing a grinding wheel is illustrated according to various embodiments. In various embodiments, a laser may be directed substantially tangential to a grinding surface of a grinding wheel (step 510). The laser may emit a continuous wave or pulsed beam, and the beam may ablate material from the grinding surface. The grinding wheel may be rotated while the laser ablates material from the grinding surface (520). The laser may be moved or steered such that the laser forms a surface profile in the grinding surface (step 530).

In various embodiments a first surface profile may be desirable for grinding a first workpiece. However, a second surface profile may be desirable for grinding a second workpiece, or a different portion of the first workpiece. The first surface profile may be ablated into grinding surface 110, and grinding wheel 100 may be used to grind the first workpiece. Grinding surface 110 may subsequently be laser ablated beyond the depth of the first surface profile, essentially eliminating the first surface profile. The second surface profile may then be laser ablated into grinding surface 110 (step 540). Thus, the processes described herein may allow grinding wheel 100 to be used in situations with different surface requirements.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of dressing a grinding wheel comprising:
   directing a laser substantially tangential to a grinding surface of the grinding wheel;
   rotating the grinding wheel;
   forming a ribbed surface profile in the grinding surface with the laser, wherein the forming the ribbed surface profile comprises:
      translating the laser across a width of the grinding surface while ablating material from the grinding wheel; and
      increasing a depth of ablation by moving the laser toward an axial center of the grinding wheel during the translating;
   removing the ribbed surface profile with the laser; and
   forming a curved surface profile in the grinding surface with the laser by translating the laser across the width of the grinding surface while ablating material from the grinding wheel.

2. The method of claim 1, wherein the grinding wheel comprises a multi-layer grinding wheel.

3. The method of claim 1, wherein the laser comprises at least one of a Nd:YAG laser, a $CO_2$ laser, and a fiber laser.

4. The method of claim 1, wherein the forming the ribbed surface profile further comprises trueing the grinding wheel.

5. The method of claim 1, wherein the curved surface profile is radially symmetrical.

6. The method of claim 1, wherein the laser is a continuous wave laser.

7. The method of claim 1, wherein the ribbed surface profile is configured to enhance cooling of the grinding surface.

8. The method of claim 1, further comprising steering the laser with a galvanometer.

9. A grinding method comprising:
   laser ablating a ribbed surface profile in a grinding wheel, wherein the laser ablating the ribbed surface profile comprises:
      translating a laser across a width of the grinding wheel while ablating material from the grinding wheel; and
      increasing a depth of ablation by moving the laser toward an axial center of the grinding wheel during the translating;
   grinding a first workpiece with the grinding wheel;
   laser ablating a curved surface profile in the grinding wheel; and
   grinding a second workpiece with the grinding wheel.

10. The method of claim 9, wherein the laser ablating comprises directing a continuous wave laser substantially tangential to a grinding surface of the grinding wheel.

11. The method of claim 9, wherein the grinding wheel comprises a multi-layer grinding wheel.

12. The method of claim 9, further comprising removing the ribbed surface profile from the grinding wheel prior to the laser ablating the curved surface profile.

13. The method of claim 9, wherein the laser ablating the ribbed surface profile comprises steering the laser with a galvanometer.

* * * * *